United States Patent [19]
Johnson

[11] Patent Number: 5,459,493
[45] Date of Patent: Oct. 17, 1995

[54] PLOT HANDLING APPARATUS

[75] Inventor: Dave W. Johnson, Anaheim, Calif.

[73] Assignee: Calcomp Inc., Anaheim, Calif.

[21] Appl. No.: 163,965

[22] Filed: Dec. 8, 1993

[51] Int. Cl.[6] .............................. G01D 15/28; B65H 29/00
[52] U.S. Cl. .............................. 346/136; 346/22; 271/184; 271/187
[58] Field of Search ..................... 346/134, 136, 346/22; 271/184, 187, 185, 186, 207, 209; 206/391, 409; 235/98 C; 221/194, 289

[56] References Cited

U.S. PATENT DOCUMENTS

| | | | |
|---|---|---|---|
| 4,354,619 | 10/1982 | Wipperman et al. | 221/263 |
| 5,177,497 | 1/1993 | Calderon et al. | 346/5 |

*Primary Examiner*—Benjamin R. Fuller
*Assistant Examiner*—Craig A. Hallacher
*Attorney, Agent, or Firm*—Wm. F. Porter, Jr.; Robert M. Wallace

[57] ABSTRACT

This is a pair of improvements for a plot rolling mechanism for a pen plotter or the like having a rolling mechanism with an entry opening and a receiving bin for receiving rolled plots. The first improvement comprises a sealing mechanism for sealing the entry opening during plotting, the sealing mechanism being rotatable between a sealing position blocking the entry opening and a retracted position not blocking the entry opening and apparatus for rotating the sealing mechanism between the sealing position and the retracted position. The second improvement comprises the receiving bin having a horizontal slot opening across the width adjacent a top edge thereof, the slot opening being of a height and width sufficient to pass a largest rolled plot therethrough; and, a flap hinged adjacent the top edge and extending over the slot, the flap having a weight sufficient to maintain it over the slot under normal use and light enough to deflect and open the slot under the weight of the lightest rolled plot expected when a rolled plot entering the receiving bin is rolling off a maximum number of allowed rolled plots already in the receiving bin.

20 Claims, 4 Drawing Sheets

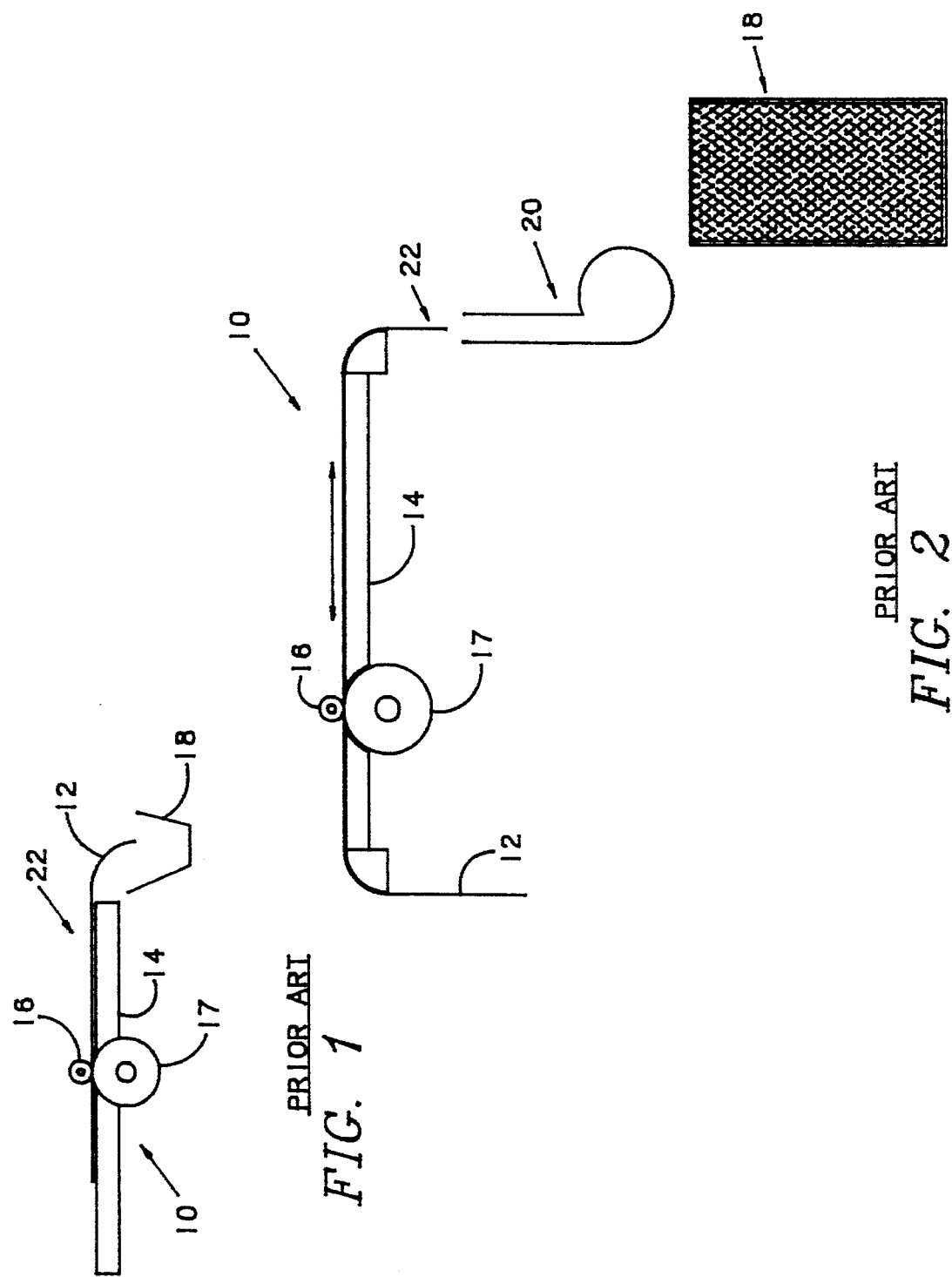

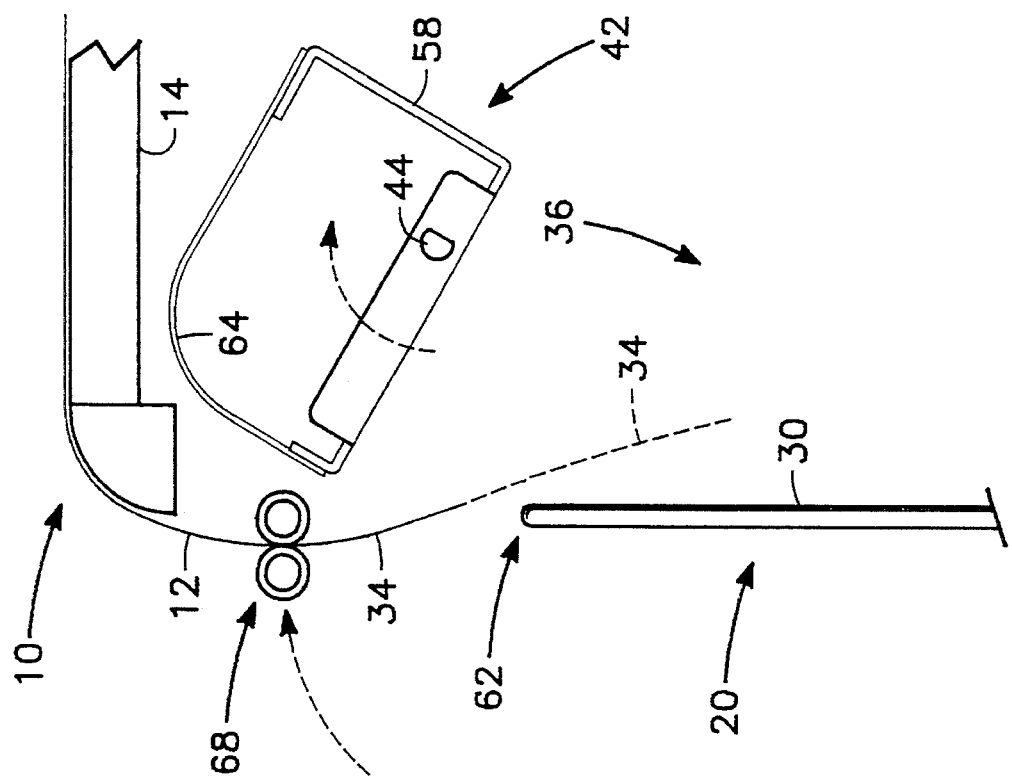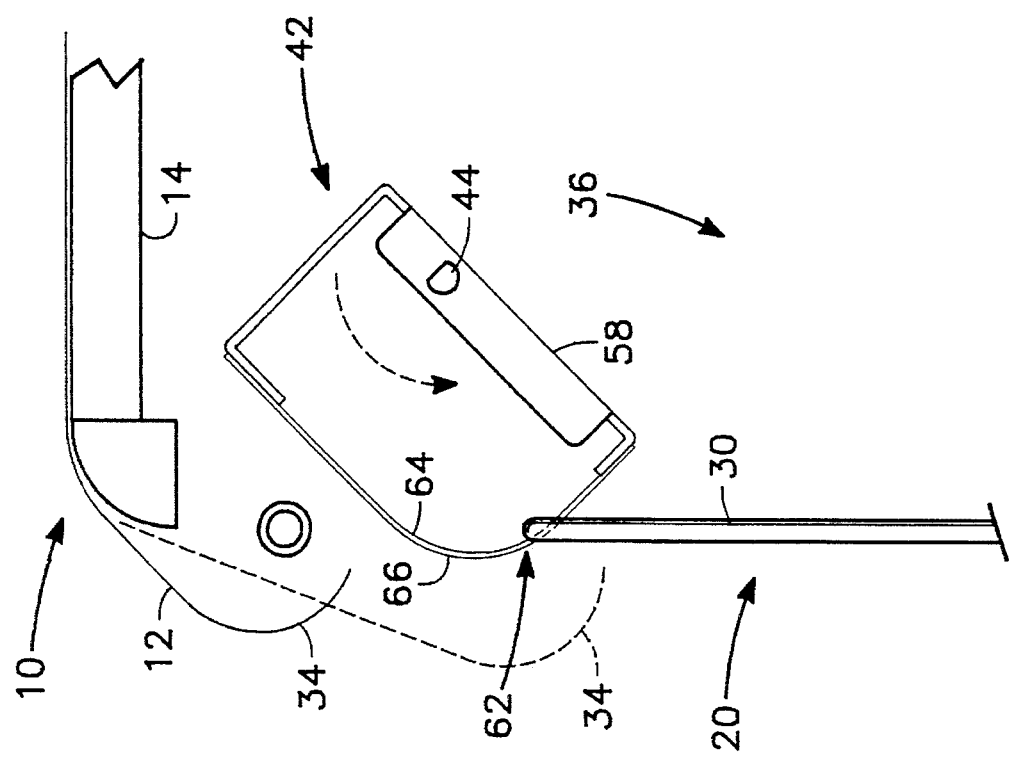

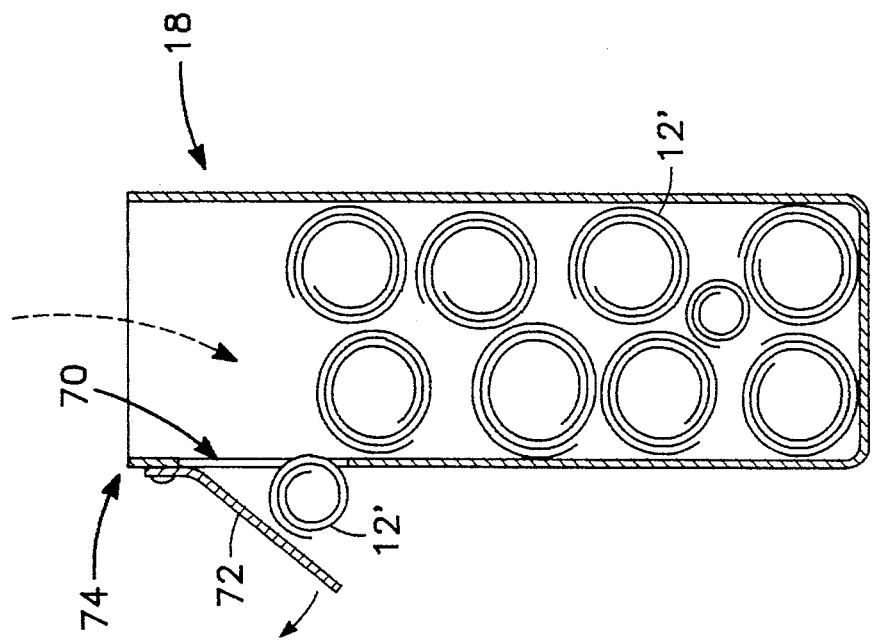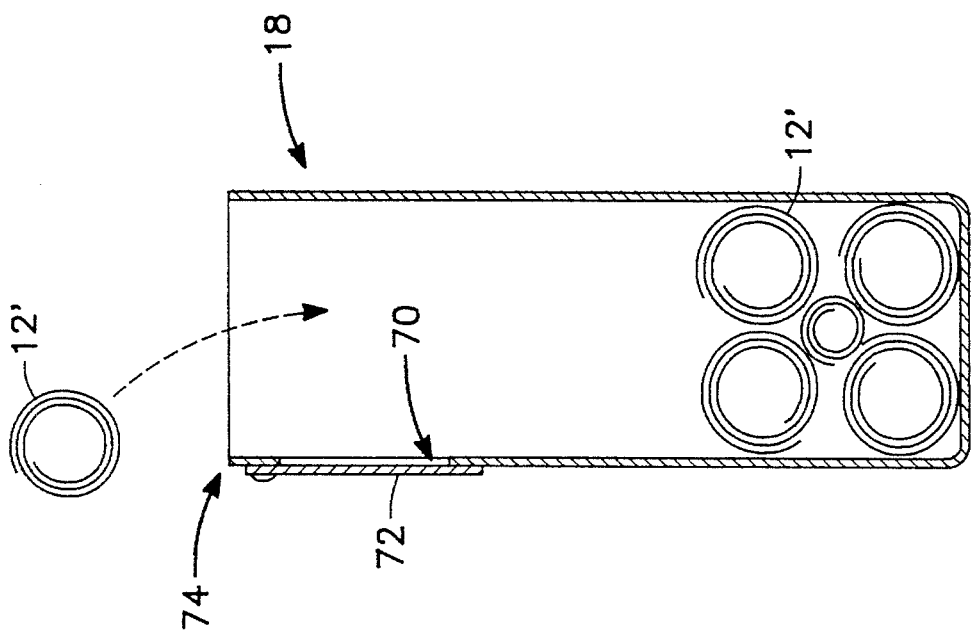

PLOT HANDLING APPARATUS

BACKGROUND OF THE INVENTION

1. Technical Field

This application relates to plot handlers for pen plotters and the like and, more particularly, in a plot rolling mechanism for a pen plotter or the like having a rolling mechanism with an entry opening and a receiving bin for receiving rolled plots, to the improvement comprising, a sealing mechanism for sealing the entry opening during plotting, the sealing mechanism being rotatable between a sealing position blocking the entry opening and a retracted position not blocking the entry opening; and, means for rotating the sealing mechanism between the sealing position and the retracted position. It also relates to the improvement of the receiving bin having a horizontal slot opening across the width adjacent a top edge thereof, the slot opening being of a height and width sufficient to pass a largest rolled plot therethrough; and, a flap hinged adjacent the top edge and extending over the slot, the flap having a weight sufficient to maintain it over the slot under normal use and light enough to deflect and open the slot under the weight of the lightest rolled plot expected when a rolled plot entering the receiving bin is rolling off a maximum number of allowed rolled plots already in the receiving bin.

2. Background Art

Pen plotters are popular so-called peripheral devices for use with computers, particularly in conjunction with applications programs such as CAD/CAM. They have an advantage over other forms of plotting of being simple in operation and construction and, therefore, lower in price. As shown in simplified form in FIG. 1, a basic pen plotter 10 after drawing the plot on the media 12 may simply move the media 12 over a support table 14 by means of a pinch roller 16 holding the media 12 against a driven drum 17 to eject the completed plot into a receiving bin 18. With large plot sheets, the completed plot can wrinkle and cause problems and poor print quality when later reproduction by a diazo process, or the like, is attempted. Attempting to roll the randomly-folded plot onto a old media roller for safe-keeping is a time-consuming and often frustrating process.

In more complex and costly devices such as electrostatic printers and plotters, a media rolling apparatus is sometimes included as part thereof. Such prior art attempts, are large and expensive and, typically, incorporate a lot of surface area over which the moving media must be moved again the friction imposed thereby. Overcoming the frictional considerations adds to the complexity and cost of the apparatus.

A prior invention assigned to the assignee of this application is disclosed in U.S. Pat. No. 5,177,497 which issued 5 Jan. 1993. The apparatus of that patent and its manner of construction and operation is shown in FIGS. 2 through 4. The rolling mechanism 20 of that invention is intended to be mounted between the ejection point 22 and the receiving bin 18 in a pen plotter 10 such as that depicted in simplified form in FIG. 1. The exact placement and the specific shape of the components are, of course, a function of the pen plotter 10 into which the rolling mechanism 20 is incorporated.

Starting with the mechanism 20 in its open position as depicted in FIG. 4, there is a stationary portion 24 and a rotating portion 26 which is mounted on and rotates in combination with the shaft 28. The stationary portion 24 comprises a first input guide portion 30 connected to a first partially-cylindrical portion 32. Thus, as the media 12 moves along its exit path, it moves over the input guide portion 30. A single, horizontal, cylindrical drive roller 38 is disposed behind the input guide portion 30 in the center thereof and extends through a slot 40 provided in the supporting structure of the first input guide portion 30 for the purpose. Because of the low friction environment of the invention, one drive roller 38 in the center is sufficient, but several across the width of the media could be employed if desired.

The rotating portion 26 comprises a second input guide portion 48 connected to a second partially-cylindrical portion 50. The second input guide portion 48 carries a free-wheeling roller 39 positioned to mate with the drive roller 38 with the media 12 therebetween. The two partially-cylindrical portions 32, 50 are pivotally joined at the location of the shaft 28. The shaft 28 is bi-directionally rotated by any appropriate drive mechanism 52 under the control of the logic 46 to rotate the rotating portion 26 between the open position of FIG. 4 and the closed position of FIG. 3.

In operation, with the mechanism 20 in its open position, the drive rollers 38 are inactivated. Upon the leading edge of the media 12 having entered the rolling mechanism 20 to a point below the drive rollers 38, the logic 46 activates the drive mechanism 52 to rotate the rotating portion 26 to the closed position of FIG. 3.

As can be seen in FIG. 3, in the closed position the two input guide portions 30, 48 form a guide slot 54 extending into a cylindrical rolling chamber 56 formed by the two partially-cylindrical portions 32, 50. The drive rollers 38 are pressed lightly against the free-wheeling rollers 39 with the media 12 therebetween. The rotating portion 26 is maintained in the closed position of FIG. 3 by the drive mechanism 52. When the rotating portion 26 is in the closed position of FIG. 3, the logic 46 activates the drive mechanism 60 which is connected to rotate the drive rollers 38. The drive rollers 38 then gently urge the media 12 forward through the guide slot 54 into the cylindrical rolling chamber 56 where it is smoothly rolled. When the logic 46 recognizes that the trailing edge of the media 12 has been reached, the logic 46 stops the drive mechanism 60 and activates the drive mechanism 52 in the opposite direction to open the rotating portion 26 to the open position of FIG. 4 whereupon the smoothly and neatly rolled media 12' falls into a receiving bin 18.

While the apparatus of FIGS. 2–4 works well for its intended purpose, there are several aspects which can be improved for various reasons. For example, the moving end of the media 12 may enter the guide slot 54 during the plotting process and become fouled in the mechanism. The receiving bin 18 may also become over-filled and back up relied media 12' into the rolling mechanism 20.

Wherefore, it is an object of the present invention to provide a way to prevent the moving end of the media from entering the guide slot during the plotting process.

It is another object of the present invention to provide a way to prevent the receiving bin from becoming over-filled and backing up rolled media into the rolling mechanism.

Other objects and benefits of this invention will become apparent from the description which follows hereinafter when read in conjunction with the drawing figures which accompany it.

SUMMARY OF THE DISCLOSURE

The foregoing objects have been realized in a plot rolling mechanism for a pen plotter or the like having a rolling mechanism with an entry opening and a receiving bin for receiving rolled plots, by the improvement of the present invention comprising, the receiving bin having a horizontal slot opening across the width adjacent a top edge thereof, said slot opening being of a height and width sufficient to pass a largest rolled plot therethrough; a flap hinged adjacent said top edge and extending over said slot, said flap being of a flexible plastic material, said flap having a weight sufficient to maintain it over said slot under normal use and light enough to deflect and open said slot under the weight of the lightest rolled plot expected when a rolled plot entering the receiving bin is rolling off a maximum number of allowed rolled plots already in the receiving bin; a sealing mechanism for sealing the entry opening during plotting, said sealing mechanism being rotatable between a sealing position blocking the entry opening and a retracted position not blocking the entry opening; and, means for rotating said sealing mechanism between said sealing position and said retracted position.

In a preferred embodiment, the invention further comprises the means for rotating the sealing mechanism being a rotatable shaft carrying the sealing mechanism. Additionally, the sealing mechanism comprises, a rotatable L-shaped member; and, a flexible sealing member carried by the L-shaped member, the flexible sealing member being a flexible plastic member having a smooth deflection surface across the entry opening of the rolling mechanism whereby a leading edge of a plot media attempting to enter the entry opening during plotting is smoothly deflected over the entry opening.

BRIEF DESCRIPTION OF THE DRAWINGS

FIG. 1 is a simplified side view of a plotting device employing one type of plot handler according to the prior art.

FIG. 2 is a simplified side view of a plotting device employing one type of plot handler according to the art.

FIG. 5 is a detailed side view of one aspect of the present invention for preventing moving plots from entering the plot rolling mechanism of FIG. 2 shown in its blocking, position while plotting is still in progress.

FIG. 6 is a detailed side view of the one aspect of the present invention for preventing moving plots from entering the plot rolling mechanism of FIG. 2 shown in its opened position for allowing finished plots to enter the mechanism and be rolled.

FIG. 7 is a detailed cutaway side view of a second aspect of the present invention as applied to the holding bin receiving rolled plots shown prior to the bin being filled.

FIG. 8 is a detailed cutaway side view of the second aspect of the present invention as applied to the holding bin receiving rolled plots shown releasing excess plots so as to prevent the bin from being over-filled.

DETAILED DESCRIPTION OF THE PREFERRED EMBODIMENT

Figures 3, 4:
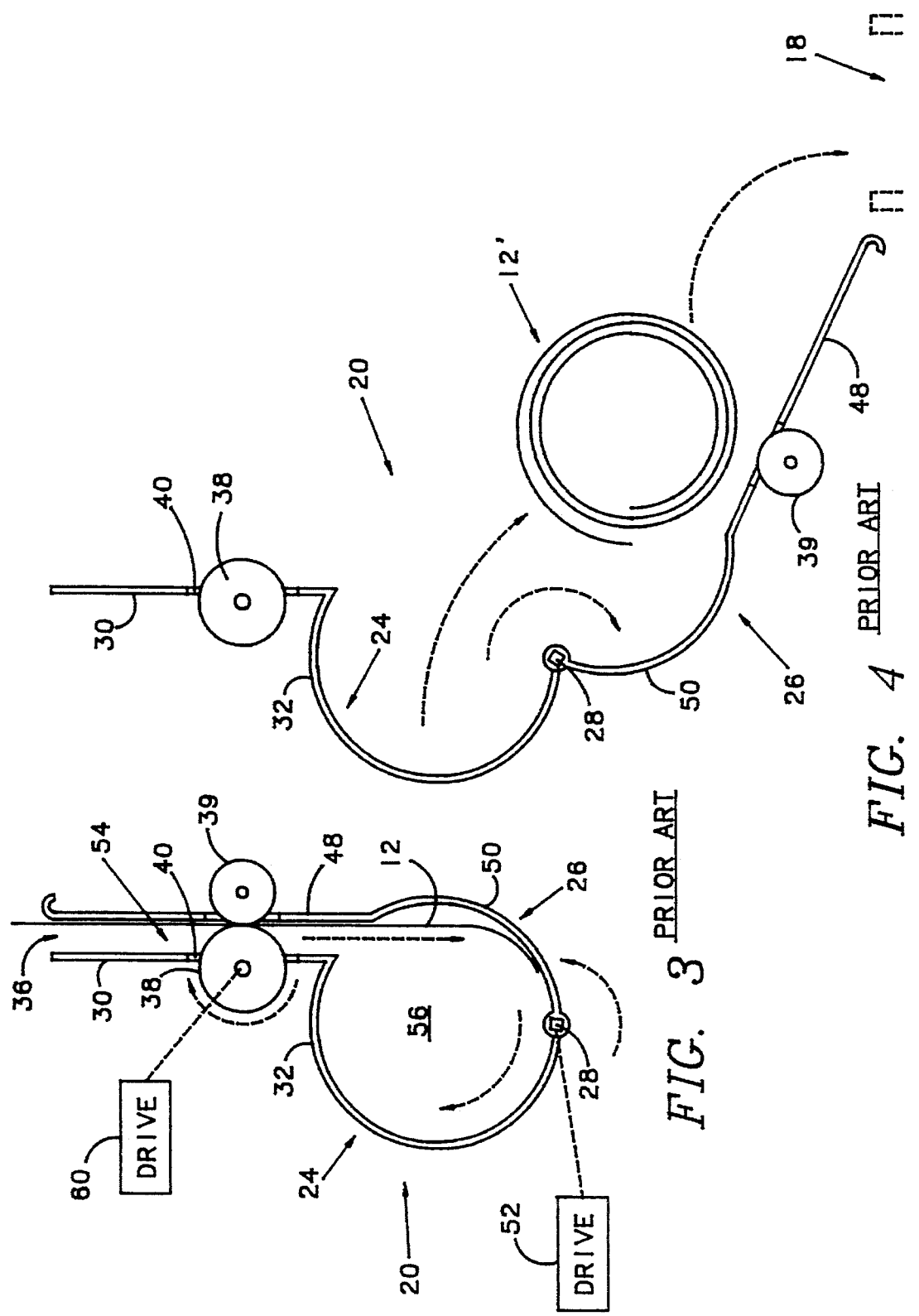
FIG. 3 is a simplified side view of the prior art plot handler of FIG. 2 in the closed position wherein it rolls completed plots.
FIG. 4 is a simplified side view of the prior art plot handler of FIG. 2 in the open position releasing a rolled completed plot into a holding bin.

The present invention comprises two aspects—one to solve each of the above-stated objectives. The solution of the first aspect is depicted in FIGS. 5 and 6. In particular, it is directed to preventing the leading edge 34 of the media 12 from entering the opening 36 of the input guide portions 30, 48 of the rolling mechanism 20 while plotting is taking place and prior to plot completion. For this purpose, there is a sealing mechanism 42 which rotates on a driven shaft 44 between the opening blocking position of FIG. 5 and the non-blocking position of FIG. 6. The driven shaft 44 can be moved between positions by any of several mechanisms well known to those of ordinary skill in the art with a solenoid and spring being preferred. The driven shaft 44 is operated by the logic of the plotter 10 at the correct time in the plotting and plot-rolling processes in a manner which should be obvious to those skilled in the art from the description which follows.

In its preferred embodiment, the sealing mechanism 42 comprises an L-shaped metal portion 58 extending along the width of the top 62 of the rolling mechanism 20. As an alternative, a plurality of smaller sealing mechanisms 42 could be spaced along the shaft 44. The intent is to have sufficient blocking to prevent the leading edge 34 of the media 12 from entering the opening 36. The two ends of the "L" of the metal portion 58 are connected by a curved, smooth, resiliently flexible member 64. A plastic such as polyethylene provides the desired qualities as depicted in the two drawing figures. In its opening-blocking position of FIG. 5, the flexible member(s) 64 extends below the top 62 of the rolling mechanism 20 and presents a smooth deflection surface 66 at the opening 36. Should the leading edge 34 of the media 12 be curved as depicted in FIG. 5 (as occurs close to the end of the supply roll), it will simply slide off the deflection surface 66 to the ghosted position of FIG. 5. When the plot is finished and it is time to roll the finished plot, the sealing mechanism 42 is rotated to the retracted and non-blocking position of FIG. 6 wherein the roller mechanism 68 can feed the leading edge 34 into the opening 36 for the plot to be rolled by the rolling mechanism 20 in the manner described in detail above. The flexible member 64 deforms slightly as it passes the roller mechanism 68.

The second aspect of the present invention is shown in FIGS. 7 and 8. It is to prevent over-filling of the receiving bin 18, which could allow rolled plots to back up and interfere with proper operation of the rolling mechanism 20. For this purpose, the receiving bin 18 is provided with a slot 70 across the width adjacent the top 74. The slot 70 is of a height at least as wide as the diameter of the widest rolled plot 12'. Being across the width, the slot 70 can, therefore, pass any rolled plot 12' therethrough. The slot 70 is sealed with a flap 72 (or plurality of spaced flap fingers) which is hinged at its top adjacent the top 74. While a solid piece of material could be used for the flap 72 with actual hinges, it is preferred that the flap 72 be of a flexible plastic such as polyethylene so that it is self-hinging from its own flexibility.

The weight of the flap 72 is sufficient to keep it down and over the slot 70 under normal conditions as depicted in FIG. 7. When the receiving bin 18 gets to its maximum capacity as shown in FIG. 8, however, the weight of the flap 72 is overcome by the weight of new rolled plots 12' rolling down the previously stacked rolled plots 12'. Then, the flap 72 opens allowing each new and excess rolled plot 12' to fall out on the floor rather than back up into the rolling mechanism 20. Obviously, to work thus, the weight of the flap 72 must be such as to be deflectable by the weight of the lightest rolled plot 12' expected.

Wherefore, having thus described the invention, What is claimed is:

1. A plot rolling mechanism associated with a plotter for receiving completed plots comprising sheets of a flexible media ejected at an exit point of the plotter, the completed plots being rolled and delivered to a receiving bin, said plot rolling mechanism comprising:

a) a stationary member comprising a first input guide portion connected to a first partially-cylindrical portion, said first input guide portion being disposed adjacent the exit point behind a path followed by a leading edge of the completed plots upon being ejected from the plotter:

b) a shaft disposed adjacent an edge of said first partially-cylindrical portion opposite said first input guide portion;

c) first drive means for bi-directionally rotating said shaft:

d) a rotating member mounted on and rotating in combination with said shaft, said rotating member comprising a second input guide portion connected to a second partially-cylindrical portion along an edge opposite an edge mounted on said shaft, said rotating member being rotatable between a closed position with said first partially-cylindrical portion and said second partially-cylindrical portion in combination forming a cylindrical rolling chamber and said first input guide portion and said second input guide portion in combination forming an entry opening leading to said cylindrical rolling chamber and an open position with said second partially-cylindrical portion and said second input guide portion forming ramp towards the receiving bin:

e) drive roller means disposed through said first input guide portion perpendicular to said path in said first input guide portion for contacting and moving the media through said entry opening into said cylindrical rolling chamber when said rotating member is in said closed position:

f) second drive means for rotating said drive roller means:

g) logic means for activating said first drive means and said second drive means to feed received completed plots through said entry opening into said cylindrical rolling chamber and for thereafter ejecting rolled completed plots to the receiving bin;

h) a sealing mechanism for sealing the entry opening during plotting, said sealing mechanism being rotatable between a sealing position blocking the entry opening and a retracted position not blocking the entry opening; and, i) means for rotating said sealing mechanism between said sealing position and said retracted position.

2. The plot rolling mechanism of claim 1 wherein:

said means for rotating said sealing mechanism is a rotatable shaft carrying said sealing mechanism.

3. The plot rolling mechanism of claim 1 wherein said sealing mechanism comprises:

a) a rotatable L-shaped member; and, b) a flexible sealing member carried by said L-shaped member, said flexible sealing member having a smooth deflection surface across the entry opening of the rolling mechanism whereby a leading edge of a plot media attempting to enter the entry opening during plotting is smoothly deflected over the entry opening.

4. The plot rolling mechanism of claim 3 wherein:

a) said rotatable L-shaped member extends substantially across the entire entry opening; and, b) said flexible sealing, member is a flexible plastic member.

5. The plot rolling mechanism of claim 3 wherein:

a) there are a plurality of said rotatable L-shaped members extending across the width of the entry opening; and, b) said flexible sealing member of each of said plurality of said rotatable L-shaped members is a flexible plastic member.

6. The plot rolling mechanism of claim 1 and additionally comprising:

a) the receiving bin having a horizontal slot opening across the width adjacent a top edge thereof, said slot opening being of a height and width sufficient to pass a largest rolled plot therethrough; and, b) a flap hinged adjacent said top edge and extending over said slot, said flap having a weight sufficient to maintain it over said slot under normal use and light enough to deflect and open said slot under the weight of the lightest rolled plot expected when a rolled plot entering the receiving bin is rolling off a maximum number of allowed rolled plots already in the receiving bin.

7. The plot rolling mechanism of claim 6 wherein:

said flap is of a flexible plastic material.

8. The plot rolling mechanism of claim 6 wherein:

said flap is a single flap extending over a substantial portion of the width of said slot.

9. The plot rolling mechanism of claim 6 wherein:

said flap comprises a plurality of spaced flap fingers extending over a substantial portion of the width of said slot.

10. A plot rolling mechanism associated with a plotter for receiving completed plots comprising sheets of a flexible media ejected at an exit point of the plotter, the completed plots being rolled and delivered to a receiving bin, said plot rolling mechanism comprising:

a) a stationary member comprising a first input guide portion connected to a first partially-cylindrical portion, said first input guide portion being disposed adjacent the exit point behind a path followed by a leading edge of the completed plot upon being ejected from the plotter:

b) a shaft disposed adjacent an edge of said first partially-cylindrical portion opposite said first input guide portion:

c) first drive means for bi-directionally rotating said shaft:

d) a rotating member mounted on and rotating in combination with said shaft, said rotating member comprising a second input guide portion connected to a second partially-cylindrical portion along an edge opposite an edge mounted on said shaft, said rotating member being rotatable between a closed position with said first partially-cylindrical portion and said second partially-cylindrical portion in combination forming a cylindrical rolling chamber and said first input guide portion and said second input guide portion in combination forming an entry opening leading to said cylindrical rolling chamber and an open position with said second partially-cylindrical portion and said second input guide portion forming a ramp towards the receiving bin:

e) drive roller means disposed through said first input guide portion perpendicular said path in said first input guide portion for contacting and moving the media through said entry opening into said cylindrical rolling chamber when said rotating member is in said closed position:

f) second drive means for rotating said drive roller means:

g) logic means for activating said first drive means and said second drive means to feed received completed plots through said entry opening into said cylindrical rolling chamber and for thereafter ejecting rolled completed plots to the receiving bin:

h) the receiving bin having a horizontal slot opening across a width adjacent a top edge thereof, said slot opening being of a height and width sufficient to pass a largest rolled plot therethrough; and, i) a flap hinged adjacent said top edge and extending over said slot, said flap having a weight sufficient to maintain said flap over said slot under normal use and light enough to deflect and open said slot under the weight of the lightest rolled plot expected when a rolled plot entering the receiving bin is rolled off a maximum number of allowed rolled plots already in the receiving bin.

11. The plot rolling mechanism of claim 10 wherein:
said flap is of a flexible plastic material.

12. The plot rolling mechanism of claim 10 wherein:
said flap is a single flap extending over a substantial portion of the width of said slot.

13. The plot rolling mechanism of claim 10 wherein:
said flap comprises a plurality of spaced flap fingers extending over a substantial portion of the width of said slot.

14. The plot rolling mechanism of claim 10 and additionally comprising:

a) a sealing mechanism for sealing the entry opening during plotting, said sealing mechanism being rotatable between a sealing position blocking the entry opening and a retracted position not blocking the entry opening; and, b) means for rotating said sealing mechanism between said sealing position and said retracted position.

15. The plot rolling mechanism of claim 14 wherein:
said means for rotating said sealing mechanism is a rotatable shaft carrying said sealing mechanism.

16. The plot rolling mechanism of claim 14 wherein said sealing mechanism comprises:

a) a rotatable L-shaped member; and, b) a flexible sealing member carried by said L-shaped member, said flexible sealing member having a smooth deflection surface across the entry opening of the rolling mechanism whereby a leading edge of a plot media attempting to enter the entry opening during plotting is smoothly deflected over the entry opening.

17. The plot rolling mechanism of claim 16 wherein:

a) said rotatable L-shaped member extends substantially across the entire entry opening; and, b) said flexible sealing member is a flexible plastic member.

18. The plot rolling mechanism of claim 16 wherein:

a) there are a plurality of said rotatable L-shaped members extending across the width of the entry opening; and, b) said flexible sealing member of each of said plurality of said rotatable L-shaped members is a flexible plastic member.

19. A plot rolling mechanism associated with a plotter for receiving completed plots comprising sheets of a flexible media ejected at an exit point of the plotter, the completed plots being rolled and delivered to a receiving bin, said plot rolling mechanism comprising:-; being disposed adjacent the exit point behind a path followed by a leading edge of the completed plot upon being ejected from the plotter:

b) a shaft disposed adjacent an edge of said first partially-cylindrical portion opposite said first input guide portion:

c) first drive means for bi-directionally rotating said shaft;

d) a rotating member mounted on and rotating in combination with said shaft, said rotating member comprising a second input guide portion connected to a second partially-cylindrical portion along an edge opposite an edge mounted on said shaft, said rotating member being rotatable between a closed position with said first partially-cylindrical portion and said second partially-cylindrical portion in combination forming a cylindrical rolling chamber and said first input guide portion and said second input guide portion in combination forming an entry opening leading to said cylindrical rolling chamber and an open position with said second partially-cylindrical portion and said second input guide portion forming a ramp towards the receiving bin:

e) drive roller means disposed through said first input guide portion perpendicular to said path in said first input guide portion for contacting and moving the media through said entry opening into said cylindrical rolling chamber when said rotating member is in said closed position:

f) second drive means for rotating said drive roller means;

g) logic means for activating said first drive means and said second drive means to feed received completed plots through said entry opening into said cylindrical rolling chamber and for thereafter ejecting rolled completed plots to the receiving bin:

h) the receiving bin having a horizontal slot opening across a width adjacent a top edge thereof, said slot opening being of a height and width sufficient to pass a largest rolled plot therethrough;

i) a flap hinged adjacent said top edge and extending over said slot, said flap being of a flexible plastic material, said flap having a weight sufficient to maintain said flap over said slot under normal use and light enough to deflect and open said slot under the weight of the lightest rolled plot expected when a rolled plot entering the receiving bin is rolled off a maximum number of allowed rolled plots already in the receiving bin;

j) a sealing mechanism for sealing the entry opening during plotting, said sealing mechanism being rotatable between a sealing position blocking the entry opening and a retracted position not blocking the entry opening; and, k) means for rotating said sealing mechanism between said sealing position and said retracted position.

20. The plot rolling mechanism of claim 19 wherein:

a) said means for rotating said sealing mechanism is a rotatable shaft carrying said sealing mechanism; wherein said sealing mechanism comprises, b) a rotatable L-shaped member; and, c) a flexible plastic sealing member carried by said L-shaped member, said flexible sealing member is a flexible plastic member having a smooth deflection surface across the entry opening of the rolling mechanism whereby a leading edge of a plot media attempting to enter the entry opening during plotting is smoothly deflected over the entry opening.

* * * * *